United States Patent
Kagawa et al.

(10) Patent No.: US 10,903,613 B2
(45) Date of Patent: Jan. 26, 2021

(54) RESIN BONDED CARBONACEOUS BRUSH AND METHOD OF MANUFACTURING THE SAME

(71) Applicant: TOYO TANSO CO., LTD., Osaka (JP)

(72) Inventors: Yoshikazu Kagawa, Mitoyo (JP); Hidenori Shirakawa, Mitoyo (JP)

(73) Assignee: TOTAN KAKO CO., LTD., Osaka (JP)

( * ) Notice: Subject to any disclaimer, the term of this patent is extended or adjusted under 35 U.S.C. 154(b) by 777 days.

(21) Appl. No.: 15/305,839

(22) PCT Filed: Apr. 7, 2015

(86) PCT No.: PCT/JP2015/001942
§ 371 (c)(1),
(2) Date: Oct. 21, 2016

(87) PCT Pub. No.: WO2015/162862
PCT Pub. Date: Oct. 29, 2015

(65) Prior Publication Data
US 2017/0047697 A1    Feb. 16, 2017

(30) Foreign Application Priority Data
Apr. 23, 2014    (JP) ................. 2014-089272

(51) Int. Cl.
*H01R 39/20* (2006.01)
*H01R 39/26* (2006.01)
(Continued)

(52) U.S. Cl.
CPC ............. *H01R 39/20* (2013.01); *H01R 39/26* (2013.01); *H01R 43/12* (2013.01); *H02K 13/00* (2013.01)

(58) Field of Classification Search
CPC ........ H01R 39/20; H01R 43/12; H01R 39/26; H02K 13/00
(Continued)

(56) References Cited

U.S. PATENT DOCUMENTS 7,129,615 B2* 10/2006 Arai ................. H01R 39/20
                                                310/251
2003/0190249 A1    10/2003 Otani et al.
(Continued)

FOREIGN PATENT DOCUMENTS

EP    1 351 348 A1    10/2003
EP    1 630 910 A2    3/2006
(Continued)

OTHER PUBLICATIONS

English translation of WO 2013/190822 A1, accessed Feb. 25, 2019 from EPO website, <http://translationportal.epo.org/emtp/translate/?ACTION=description-retrieval&COUNTRY=JP&ENGINE=google&FORMAT=docdb&KIND=A1 &LOCALE=en_EP&Number=WO2013190822&OPS=ops.epo.org/3.2&SRCLANG=ja&TRGLANG=en>.*

(Continued)

*Primary Examiner* — Jeremy A Luks
(74) *Attorney, Agent, or Firm* — Westerman, Hattori, Daniels & Adrian, LLP

(57) ABSTRACT

A carbonaceous material is fabricated by kneading of carbon powder and a binder. The carbonaceous material is granulated such that an average particle diameter of the carbonaceous material is 0.3 mm or more. A brush material is fabricated by mixing of the granulated carbonaceous material and metallic powder. A ratio of the metallic powder to a total weight of the brush material is adjusted to 1% by weight or more and 30% by weight or less. Pressure molding is performed on the fabricated brush material, and thermal (Continued)

processing is further performed on the brush material at a temperature at which a resin in the brush material is not carbonized.

7 Claims, 11 Drawing Sheets

(51) Int. Cl.
 *H01R 43/12* (2006.01)
 *H02K 13/00* (2006.01)
(58) Field of Classification Search
 USPC .......................................................... 310/251
 See application file for complete search history.

(56) References Cited

U.S. PATENT DOCUMENTS

| | | |
|---|---|---|
| 2006/0043819 A1 | 3/2006 | Kobayashi |
| 2012/0194029 A1 | 8/2012 | Nishio et al. |
| 2015/0171581 A1 | 6/2015 | Morita et al. |

FOREIGN PATENT DOCUMENTS

| | | | | |
|---|---|---|---|---|
| GB | 2389358 A | * | 12/2003 | ............. H01R 39/20 |
| JP | 55-53155 A | | 4/1980 | |
| JP | 1-295642 A | | 11/1989 | |
| JP | 2-162674 A | | 6/1990 | |
| JP | 7-67294 A | | 3/1995 | |
| JP | 2003-134740 A | | 5/2003 | |
| JP | 2003-299319 A | | 10/2003 | |
| JP | 2006-67702 A | | 3/2006 | |
| JP | 2006-81231 A | | 3/2006 | |
| JP | 2012-50276 A | | 3/2012 | |
| JP | 2012-178967 A | | 9/2012 | |
| WO | 2013/190822 A1 | | 12/2013 | |

OTHER PUBLICATIONS

Office Action dated Oct. 24, 2017, issued in counterpart Japanese Application No. 2014-089272, with English machine translation. (7 pages).
International Search Report dated Jun. 30, 2015, issued in counterpart International Application No. PCT/JP2015/001942 (2 pages).
Extended Search Report dated Dec. 7, 2017, issued in counterpart European Application No. 15783580.2 (8 pages).

* cited by examiner

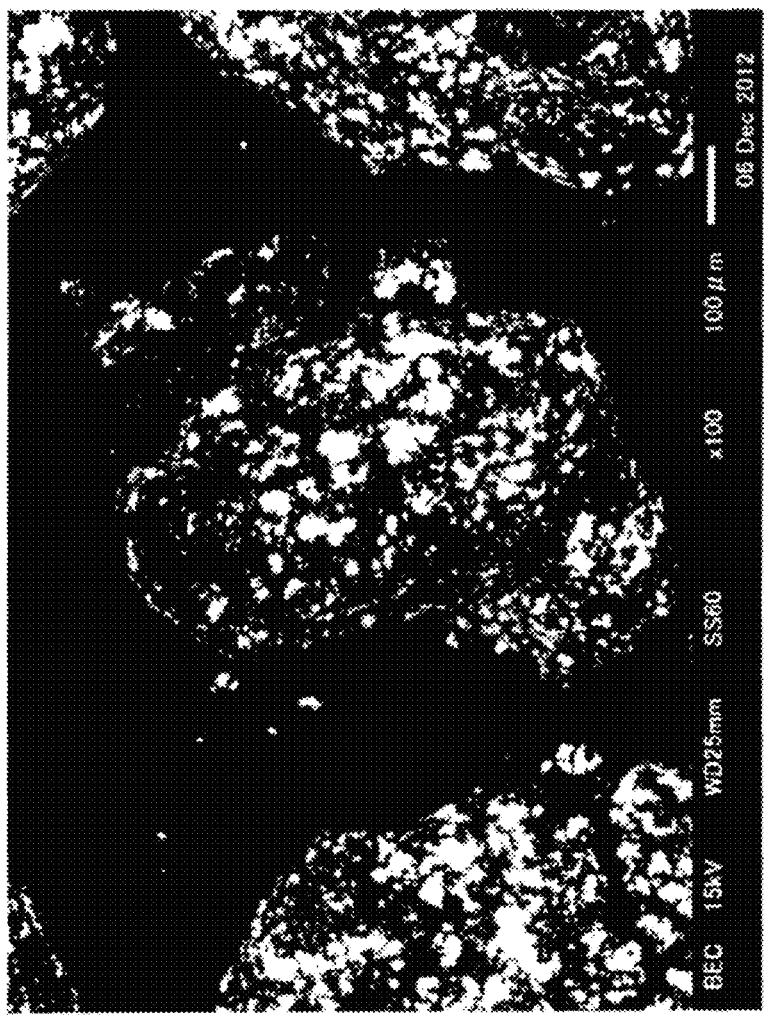
FIG. 3   INVENTIVE EXAMPLE 1

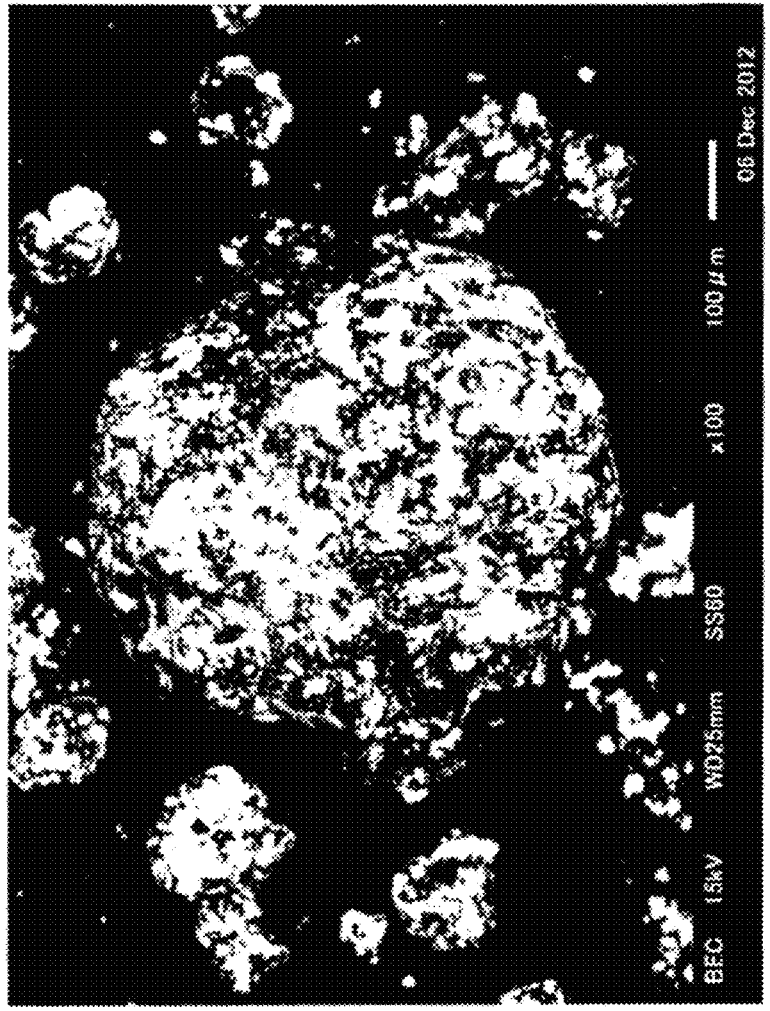
FIG. 4  INVENTIVE EXAMPLE 2

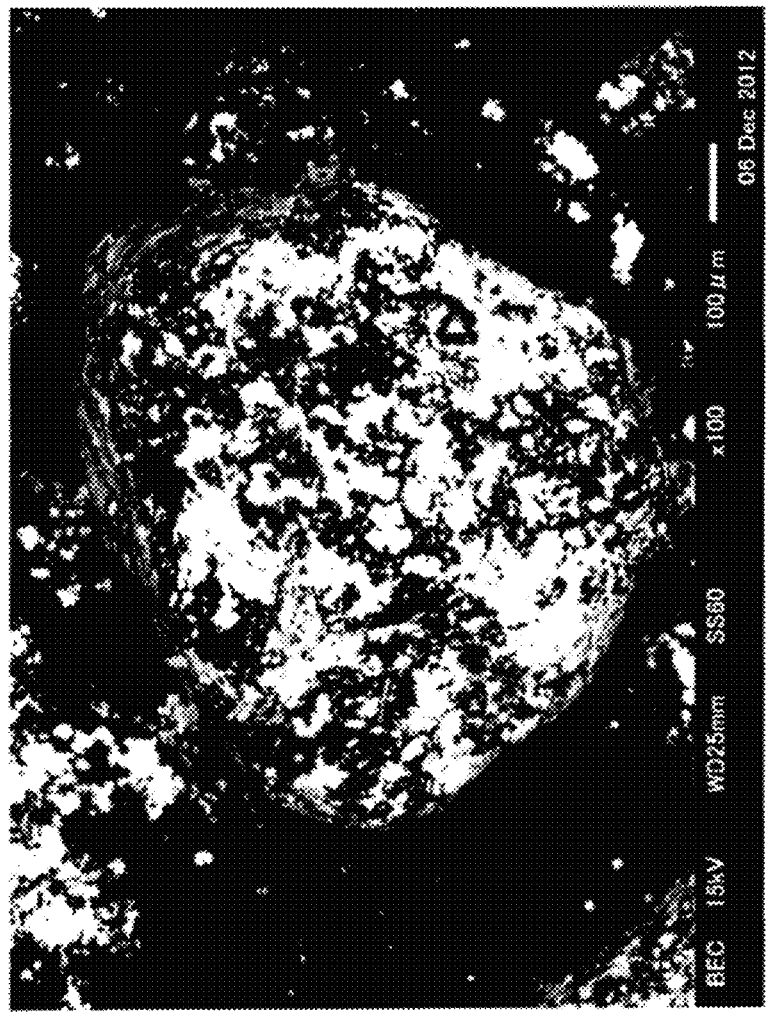
FIG. 5 INVENTIVE EXAMPLE 3

INVENTIVE EXAMPLE 1

INVENTIVE EXAMPLE 2

INVENTIVE EXAMPLE 3

RESIN BONDED CARBONACEOUS BRUSH AND METHOD OF MANUFACTURING THE SAME

TECHNICAL FIELD

The present invention relates to a resin bonded carbonaceous brush and a method of manufacturing the resin bonded carbonaceous brush.

BACKGROUND ART

A resin bonded carbonaceous brush that includes carbon and is formed by resin bonding is used as a brush of a motor (see Patent Document 1, for example). The resin bonded carbonaceous brush has sufficient flexibility, and has high lubrication ability with respect to a rotating body (a rotor). Therefore, friction noise generated between the resin bonded carbonaceous brush and the rotating body is relatively small, and it is possible to reduce the noise of the motor by using the resin bonded carbonaceous brush. The resin bonded carbonaceous brush is used in a motor of a home electric appliance of which the quietness is required.
[Patent Document 1] JP 2012-50276 A

SUMMARY OF INVENTION

Technical Problem

Because the resin bonded carbonaceous brush has the large content of a resin, electrical resistivity is relatively high. In order to increase an output of the motor, it is required to decrease the electrical resistivity of the resin bonded carbonaceous brush.

An object of the present invention is to provide a resin bonded carbonaceous brush in which electrical resistivity is decreased, and a method of manufacturing the resin bonded carbonaceous brush.

Solution to Problem (1) A resin bonded carbonaceous brush according to one aspect of the present invention includes a carbonaceous material that includes carbon and a resin, and metallic powder arranged among particles of the carbonaceous material, wherein an average particle diameter of the carbonaceous material is 0.3 mm or more, and a ratio of the metallic powder to the entire carbonaceous material and metallic powder is 1% by weight or more and 30% by weight or less.

In this resin bonded carbonaceous brush, conductivity is increased by arrangement of the metallic powder among the particles of the carbonaceous material, and thus the electrical resistivity is decreased. In this case, because the average particle diameter of the carbonaceous material is 0.3 mm or more, the metallic powder is arranged not dispersively but in a concentrated manner among the particles of the carbonaceous material. Thus, a three-dimensional net-like connection of metal is formed. As a result, the electrical resistivity is decreased effectively.

Further, because a ratio of the metallic powder to the entire carbonaceous material and metallic powder is 1% by weight or more, sufficient conductivity is attained by the metallic powder. Further, because a ratio of the metallic powder to the entire carbonaceous material and metallic powder is 30% by weight or less, a decrease in bonding force among the particles of the carbonaceous material is prevented.

(2) The average particle diameter of the carbonaceous material may be 2.5 mm or less. In this case, the resin bonded carbonaceous brush can be molded easily while the electrical resistivity decreases.

(3) The metallic powder may be silver powder. In this case, oxidation of the metallic powder is suppressed, and the electrical resistivity decreases effectively by the use of silver, which inherently has low electrical resistivity.

(4) A metal layer may be formed by the metallic powder arranged among the particles of the carbonaceous material, and the metal layer may have a thickness of 1 μm or more and 20 μm or less. In this case, because the three-dimensional metallic connection is formed by the metallic layer, the electrical resistivity decreases effectively.

(5) A method of manufacturing a resin bonded carbonaceous brush according to another aspect of the present invention includes the steps of fabricating a carbonaceous material by mixing carbon powder and a resin, adjusting an average particle diameter of the formed carbonaceous material to 0.3 mm or more, fabricating a brush material by mixing the carbonaceous material and metallic powder of which the average particle diameters are adjusted, molding the fabricated brush material, and performing the heat-treating on the molded brush material at a temperature at which the resin included in the carbonaceous material does not carbonize, wherein a ratio of the metallic powder to the entire carbonaceous material and metallic powder is adjusted to 1% by weight or more and 30% by weight or less in the step of mixing the carbonaceous material and the metallic powder.

This manufacturing method causes the conductivity to increase by the arrangement of the metallic powder among the particles of the carbonaceous material and the electrical resistivity to decrease. In this case, because the average particle diameter of the carbonaceous material is 0.3 mm or more, the metallic powder is arranged not dispersively but in a concentrated manner among the particles of the carbonaceous material. Thus, the three-dimensional net-like connection of metal is formed. As a result, the electrical resistivity decreases effectively.

Further, because a ratio of the metallic powder to the entire carbonaceous material and metallic powder is 1% by weight or more, the conductivity caused by the metallic powder is ensured sufficiently. Further, because a ratio of the metallic powder to the entire carbonaceous material and metallic powder is 30% by weight or less, a decrease in bonding force among the carbonaceous particles is prevented.

(6) The step of fabricating the brush material may be performed with the resin in the carbonaceous material being uncured. In this case, because the metallic powder is more likely to adhere to the carbonaceous material, the three-dimensional net-like connection of metal can be formed efficiently.

(7) An average particle diameter of the metallic powder may be 0.5 μm or more and 20 μm or less in the step of fabricating the brush material. In this case, the electrical resistivity decreases effectively by the three-dimensional net-like connection of metal.

Advantageous Effects of Invention

The present invention causes the electrical resistivity of the resin bonded carbonaceous brush to decrease.

BRIEF DESCRIPTION OF DRAWINGS

FIG. 3 is a diagram showing surfaces of carbonaceous particles of an inventive example 1 observed by a microscope.

FIG. 4 is a diagram showing surfaces of carbonaceous particles of an inventive example 2 observed by the microscope.

FIG. 5 is a diagram showing surfaces of carbonaceous particles of an inventive example 3 observed by the microscope.

DESCRIPTION OF EMBODIMENTS

A resin bonded carbonaceous brush according to one embodiment of the present invention will be described below with reference to the drawings.

(1) CONFIGURATION OF BRUSH

Figure 1:
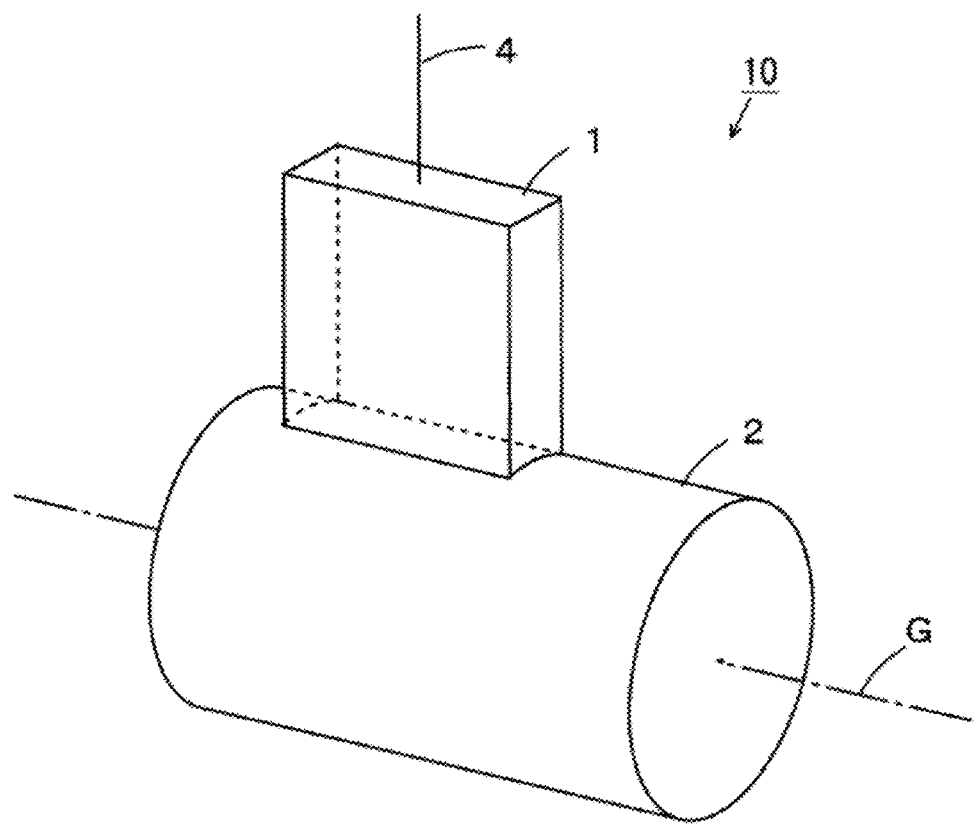
FIG. 1 is a schematic perspective view of an AC motor using a resin bonded carbonaceous brush according to the present embodiment.

FIG. 1 is a schematic perspective view of an AC motor using the resin bonded carbonaceous brush according to the present embodiment (hereinafter abbreviated as, a brush). The AC motor 10 of FIG. 1 includes the brush 1 and a rotating body 2. The rotating body 2 is a commutator and provided to be rotatable around a rotation axis G. A lead wire 4 is connected to the brush 1. The brush 1 is biased by a brush spring (not shown) such that one end of the brush 1 comes into contact with an outer peripheral surface of the rotating body 2. An electric current is supplied from a power source (not shown) to the brush 1 through the lead wire 4. The rotating body 2 is rotated around, the rotation axis G by the supply of the current from the brush 1 to the rotating body 2. The brush 1 slides with respect to the rotating body 2 by the rotation of the rotating body 2.

While the brush 1 is used in the AC motor 10 in the present embodiment, the present invention is not limited to this. The brush 1 may be used in a DC motor.

(2) METHOD OF MANUFACTURING BRUSH

The method of manufacturing the brush 1 will be described. First, a carbonaceous material is fabricated by kneading of carbon powder and a binder. As the carbon powder, graphite powder is preferably used. As the graphite powder, natural graphite powder, artificial graphite powder, expanded graphite powder or the like can be used, and a mixture of more than one of these may be used. As the binder, a synthetic resin can be used, and any one of a thermosetting synthetic resin and a thermoplastic synthetic resin or a mixture of these may be used.

As the binder, an epoxy resin, a phenol resin, a polyester resin, a vinylester resin, a furan resin, a polyamide resin, or a polyimide resin is preferably used. Further, these binders may be dissolved in a solvent of ketones such as acetone or alcohols such as methanol or ethanol, and a dissolving liquid may be kneaded with the carbon powder.

A ratio of the carbon powder to the total weight of the carbon powder and the binder is 5% by weight or more and 95% by weight or less, for example, and is preferably 50% by weight or more and 90% by weight or less.

During the kneading of the carbon powder and the binder, one or more types of tungsten, tungsten carbide, molybdenum and sulfides of tungsten, tungsten carbide and molybdenum may be added as an additive. A ratio of the additive to the total weight of the carbon powder and the binder is 0.1% by weight or more and 10% by weight or less, for example, and is preferably 1% by weight or more and 5% by weight or less.

Next, the carbonaceous material is granulated such that an average particle diameter of the carbonaceous material is 0.3 mm or more. In this case, granulation may be performed by kneading, or granulated powder may be sized by the use of a sieve. Alternatively, granulation may be performed by another method such as grinding of the carbonaceous material. An average particle diameter of the granulated carbonaceous material is preferably 0.3 mm or more and 2.5 mm or less, and is more preferably 0.8 mm or more and 2.0 mm or less.

A brush material is fabricated by mixing of the granulated carbonaceous material and metallic powder. A ratio of the metallic powder to the total weight of the brush material is adjusted to 1% by weight or more and 30% by weight or less, and is preferably 2.5% by weight or more and 10% by weight or less. As the metallic powder, silver powder or copper powder is used, for example. In the case where the silver powder is used as the metallic powder, apparent density of the silver powder is preferably 0.5 g/cm$^3$ or more and 0.8 g/cm$^3$ or less. Further, the smaller an average particle diameter of the metallic powder is, the more easily a three-dimensional net-like connection (hereinafter referred to as a metal network) of metal is formed. On the other hand, when the average particle diameter of the metallic powder is too small, difficulty arises while handling of the metallic powder. Thus, the average particle diameter of the metallic powder is preferably 0.5 μm or more and 20 μm or less, and is more preferably 2 μm or more and 10 μm or less.

When the carbonaceous material and the metallic powder are mixed, a resin included in the carbonaceous material is preferably uncured. Because the metallic powder adheres easily to the uncured resin, the metallic powder can adhere uniformly to surfaces of the carbonaceous material. Thus, the metal network can be formed efficiently. Further, the carbonaceous material and the metallic powder may be mixed with the resin being uncured and a solvent of the binder remaining.

Then, pressure molding of the fabricated brush material is performed. Subsequently, thermal processing is performed on the molded brush material at a temperature at which a resin is not carbonized. Thus, the resin in the brush material is cured and bonded, and a resin bonded brush base material is fabricated. A temperature of the thermal processing is a temperature at which the resin in the brush material is not carbonized, and 150° C. or more and 250° C. or less, for example. The thermal processing is preferably performed in a nitrogen atmosphere, an ammonia reduction atmosphere or in a vacuum. In this case, oxidation of the metallic powder can be suppressed. The brush 1 having desired measurement and shape is fabricated from the fabricated brush base material.

Figure 2A:
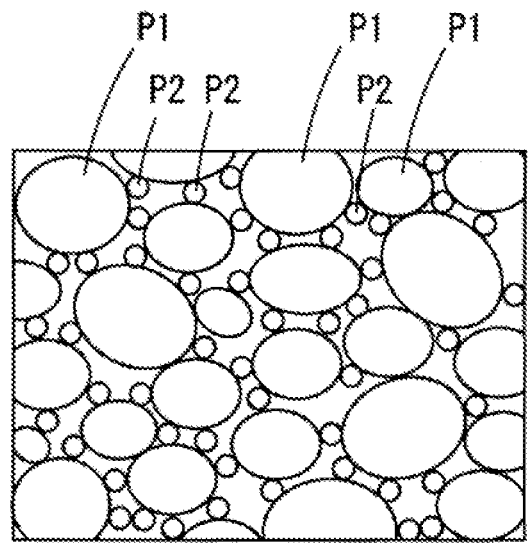
FIGS. 2A and 2B are diagrams for explaining a relationship between an average particle diameter of a carbonaceous material and electrical resistivity.
Figure 2B:
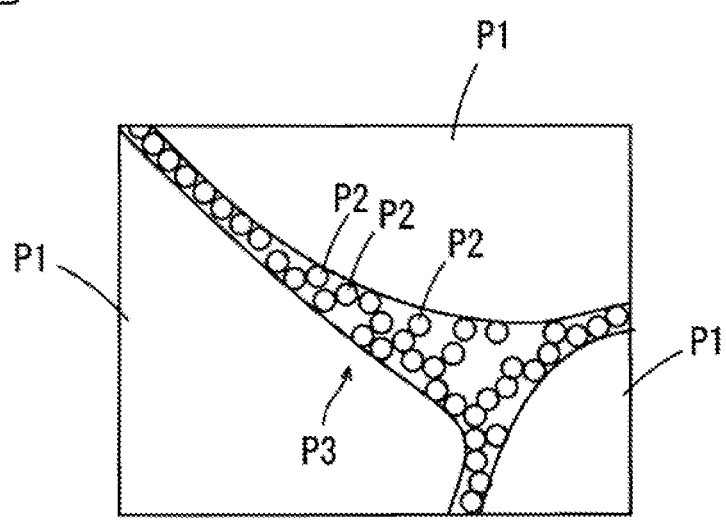

FIGS. 2A and 2B are diagrams for explaining a relationship between the average particle diameter of the carbonaceous material and the electrical resistivity. In FIG. 2A, a state of particles of the carbonaceous material and metallic, particles in the case where the average particle diameter of the carbonaceous material is relatively small is shown. In FIG. 2B, a state of particles of the carbonaceous material and the metallic particles in the case where particle diameters of the carbonaceous material are relatively large is shown. Hereinafter, particles of the granulated carbonaceous material are referred to as carbonaceous particles.

In the case where the average particle diameter of the carbonaceous material is smaller than 0.3 mm and about 0.1 mm, for example, the plurality of carbonaceous particles P1 and the plurality of metallic particles P2 are arranged respectively and dispersively as shown in FIG. 2A. Therefore, the plurality of metallic particles P2 are unlikely to come into contact with one another, and the electrical resistivity of the brush 1 increases.

On the other hand, in the case where the average particle diameter of the carbonaceous material is 0.3 mm or more, the plurality of metallic particles P2 are arranged in a concentrated and successive manner in gaps formed among the plurality of carbonaceous particles P1, and the metal network is formed as shown in FIG. 2B. Thus, the conductivity caused by the plurality of metallic particles P2 is ensured, and the electrical resistivity of the brush 1 decreases.

The thickness of a metal layer formed by the metallic particles P2 among the plurality of carbonaceous particles P1 is preferably 1 μm or more and 20 μm or less. In this case, the electrical resistivity decreases effectively by the metal network.

Further, in the case where the average particle diameter of the carbonaceous material is adjusted to be larger than 2.5 mm, the molding of the brush 1 becomes difficult. Therefore, the brush 1 can be molded easily while the electrical resistivity of the brush 1 is decreased by the adjustment of the average particle diameter of the carbonaceous material to 2.5 mm or less.

Further, because a ratio of the metallic powder in the brush material is adjusted to 1% by weight or more, the conductivity caused by the plurality of metallic particles P2 is ensured. On the other hand, because a ratio of the metallic powder in the brush material is adjusted to 30% by weight or less, entire surfaces of the carbonaceous particles P1 are not covered by the metallic particles P2. Therefore, a decrease in bonding force among the plurality of carbonaceous particles P1 is prevented. Therefore, bending strength of the brush 1 is ensured. Further, because a ratio of metal does not become too large, negative influence on sliding properties can be prevented.

In order to decrease the electrical resistivity, performing the metallic plating (copper plating, for example) on the surface of the brush 1 instead of the addition of the metallic powder to the carbonaceous material can be considered. However, variations in electrical resistivity of the brush 1 are likely to occur due to differences in thickness of a plating layer. Further, when stripping of the plating layer occurs, the electrical resistivity of the brush 1 changes largely. Therefore, the electrical resistivity of the brush 1 may not be stable depending on a situation.

In contrast, in the present embodiment, because the average particle diameter of the carbonaceous material and the ratio of the metallic powder in the brush material are adjusted to be in constant ranges before the pressure molding and the thermal processing, variations are unlikely to be generated in the electrical resistivity of the brush 1. Further, the electrical resistivity of the brush 1 hardly changes largely. Further, because highly conductive portions are not distributed unevenly on the surface of the brush 1, fluctuation of the electrical conductivity caused by the carbonaceous material decreases. Therefore, the electrical conductivity can decrease effectively.

(3) EFFECTS

In this manner, in the present embodiment, the carbonaceous material is granulated such that the average particle diameter of the carbonaceous material is 0.3 mm or more, and then the carbonaceous material and the metallic powder are mixed. Thereafter, the pressure molding and the thermal processing of the brush material made of the carbonaceous material and the metallic powder are performed.

Thus, because the metallic powder is arranged among the particles of the carbonaceous material, the conductivity increases, and the electrical resistivity decreases. In this case, because the average particle diameter of the carbonaceous material is 0.3 mm or more, the metallic powder is arranged not dispersively but in a concentrated manner among the particles of the carbonaceous material. Thus, the electrical resistivity decreases effectively.

Further, in the present embodiment, because a ratio of the metallic powder to the entire carbonaceous material and metallic powder is adjusted to 1% by weight or more, the conductivity caused by the metallic powder is ensured sufficiently. Further, because a ratio of the metallic powder to the entire carbonaceous material and metallic powder is adjusted to 30% by weight or less, a decrease in bonding force among the particles of the carbonaceous material is prevented. Therefore, mechanical strength such as the bending strength of the brush 1 is ensured.

(4) INVENTIVE EXAMPLES AND COMPARATIVE EXAMPLES (4-1) Inventive Example 1

Artificial graphite powder having high crystallinity was used as the carbon powder, and an epoxy resin dissolved in acetone was added to the carbon powder as the binder. Then, a carbonaceous material was fabricated by kneading of these at room temperature. An average particle diameter of the carbon powder before the kneading was 50 μm. Further, 20 parts by weight of the epoxy resin was used for 80 parts by weight of the carbon powder.

Subsequently, the carbonaceous material was granulated by kneading, and particle diameters of the carbonaceous material were adjusted with the use of a sieve such that an average particle diameter was 0.8 mm. Silver powder having an average particle diameter of 5.6 μm was added to the carbonaceous material after the adjustment of the particle diameters, and these were mixed by a powder mixer. Thus, the brush material was fabricated. In this case, amounts of the carbonaceous material and the metallic powder were adjusted such that ratios of the carbonaceous material and the metallic powder in the brush material were 97.5% by weight and 2.5% by weight, respectively. The pressure molding was performed on the fabricated brush material with the pressure of 2 t/cm², and the thermal processing was performed on the molded brush material at 200° C. Thus, a brush base material was fabricated.

(4-2) Inventive Example 2

A brush base material was fabricated similarly to the inventive example 1 except that ratios of the carbonaceous material and the metallic powder in the brush material were adjusted to 95.0% by weight and 5.0% by weight, respectively.

(4-3) Inventive Example 3

A brush base material was fabricated similarly to the inventive example 1 except that ratios of the carbonaceous material and the metallic powder in the brush material were adjusted to 90.0% by weight and 10.0% by weight, respectively.

(4-4) Inventive Example 4

A brush base material was fabricated similarly to the inventive example 1 except that the particle diameters of the carbonaceous material were adjusted such that an average particle diameter was 2.0 mm.

(4-5) Inventive Example 5

A brush base material was fabricated similarly to the inventive example 1 except that the particle diameters of the carbonaceous material were adjusted such that an average particle diameter was 1.5 mm.

(4-6) Inventive Example 6

A brush base material was fabricated similarly to the inventive example 1 except that the particle diameters of the carbonaceous material were adjusted such that an average particle diameter was 1.0 mm.

(4-7) Inventive Example 7

A brush base material was fabricated similarly to the inventive example 1 except that the particle diameters of the carbonaceous material were adjusted such that an average particle diameter was 0.5 mm.

(4-8) Comparative Example 1

A brush base material was fabricated similarly to the inventive example 1 except for the following points. A carbonaceous material was fabricated by kneading of the carbon powder and the binder, and then the carbonaceous material was dried by a hot-air dryer. Then, the carbonaceous material was ground by a grinder such that an average particle diameter was 0.25 mm. Thereafter, the brush base material was fabricated by the pressure molding and the thermal processing of the carbonaceous material without addition of silver powder.

(4-9) Comparative Example 2

A brush base material was fabricated similarly to the comparative example 1 except that the particle diameters of the carbonaceous material were adjusted by a wet granulator such that an average particle diameter was 0.8 mm.

(4-10) Comparative Example 3

A brush base material was fabricated similarly to the comparative example 1 except for the following point. Silver powder was added to the carbonaceous material such that ratios of the carbonaceous material and the metallic powder were 97.5% by weight and 2.5% by weight, respectively.

(5) EVALUATION

(5-1) Surfaces of Particles of Carbonaceous Material

Figure 6:
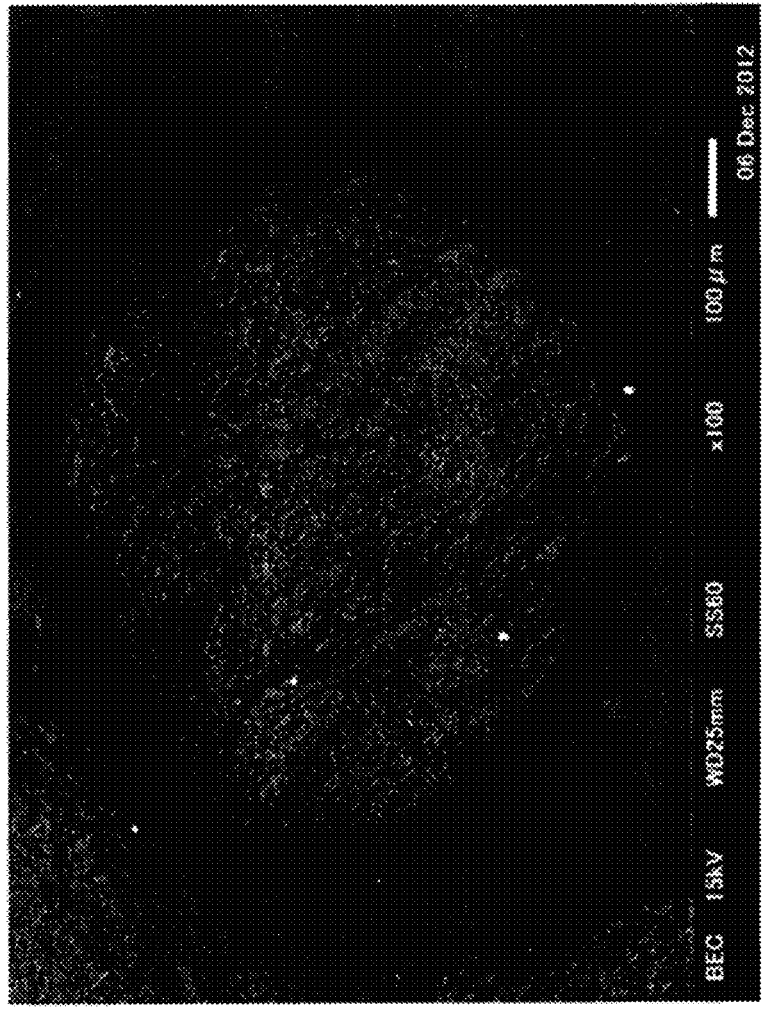
FIG. 6 is a diagram showing surfaces of carbonaceous particles of a comparative example 1 observed by the microscope.

In each of the inventive examples 1 to 3, and the comparative example 1, surfaces of the carbonaceous particles before the pressure molding were observed by a microscope. FIG. 3 is a diagram showing the surfaces of the carbonaceous particles of the inventive example 1 observed by the microscope. FIG. 4 is a diagram showing the surfaces of the carbonaceous particles of the inventive example 2 observed by the microscope. FIG. 5 is a diagram showing the surfaces of the carbonaceous particles of the inventive example 3 observed by the microscope. FIG. 6 is a diagram showing the surfaces of the carbonaceous particles of the comparative example 1 observed by the microscope.

As shown in each of FIGS. 3 to 5, in each of the inventive examples 1 to 3, the silver powder adheres substantially uniformly to the surfaces of the carbonaceous particles. Therefore, in the case where the brush 1 is fabricated by the pressure molding and the thermal processing of each of these carbonaceous materials (the brush materials), the silver powder is arranged intensively among the plurality of carbonaceous particles, and the electrical resistivity of the brush 1 decreases.

Further, as compared to the inventive example 1 shown in FIG. 3, an amount of the silver powder that adheres to the particle surfaces of the carbonaceous material is large in the inventive example 2 shown in FIG. 4. Further, as compared to the inventive example 2 shown in FIG. 4, an amount of the silver powder that adheres to the particle surfaces of the carbonaceous material is large in the inventive example 3 shown in FIG. 5. Therefore, the electrical resistivity of the brush 1 corresponding to the inventive example 2 is low as compared to the electrical resistivity of the brush 1 corresponding to the inventive example 1, and the electrical resistivity of the brush 1 corresponding to the inventive example 3 is low as compared to the electrical resistivity of the brush 1 corresponding to the inventive example 2.

On the other hand, as shown in FIG. 6, the silver powder does not adhere to the particle surfaces of the carbonaceous material in the comparative example 1. Therefore, even if the brush 1 is fabricated by the pressure molding and the thermal processing of this carbonaceous material, the electrical resistivity of the brush 1 does not decrease.

(5-2) Cut Section

Figure 7:
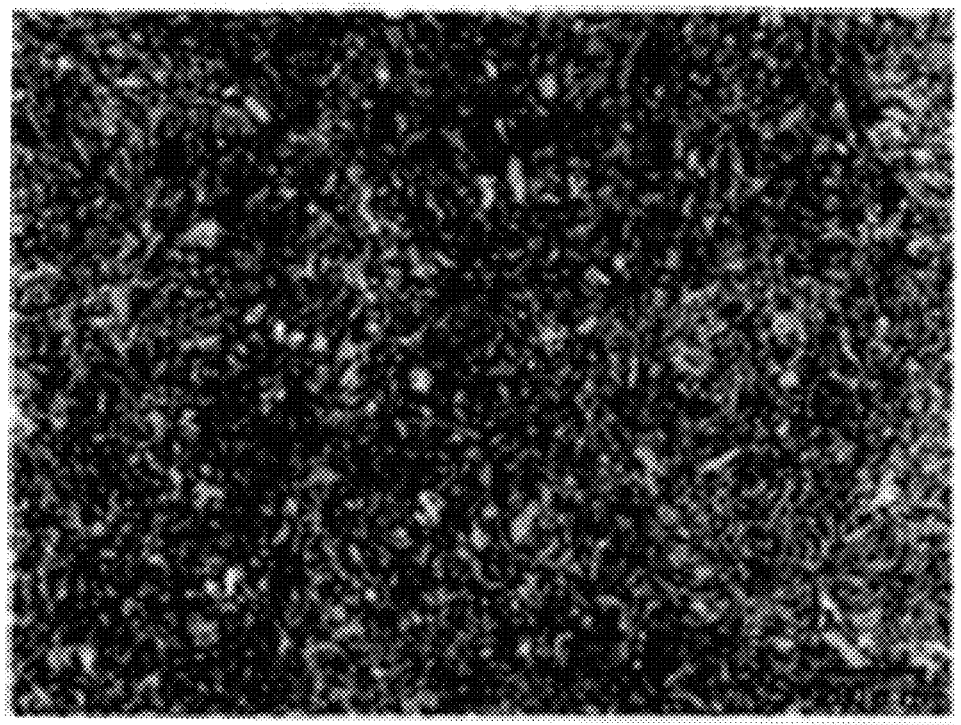
FIG. 7 is a diagram showing a cut section of a brush base material of the inventive example 1 observed by the microscope.

In each of the inventive examples 1 to 3, a cut section of the fabricated brush base material was observed by the microscope. FIG. 7 is a diagram showing a cut section of the brush base material of the inventive example 1 observed by the microscope, FIG. 8 is a diagram showing a cut section of the brush base material of the inventive example 2 observed by the microscope, and FIG. 9 is a diagram showing a cut section of the brush base material of the inventive example 3 observed by the microscope.

Figure 8:
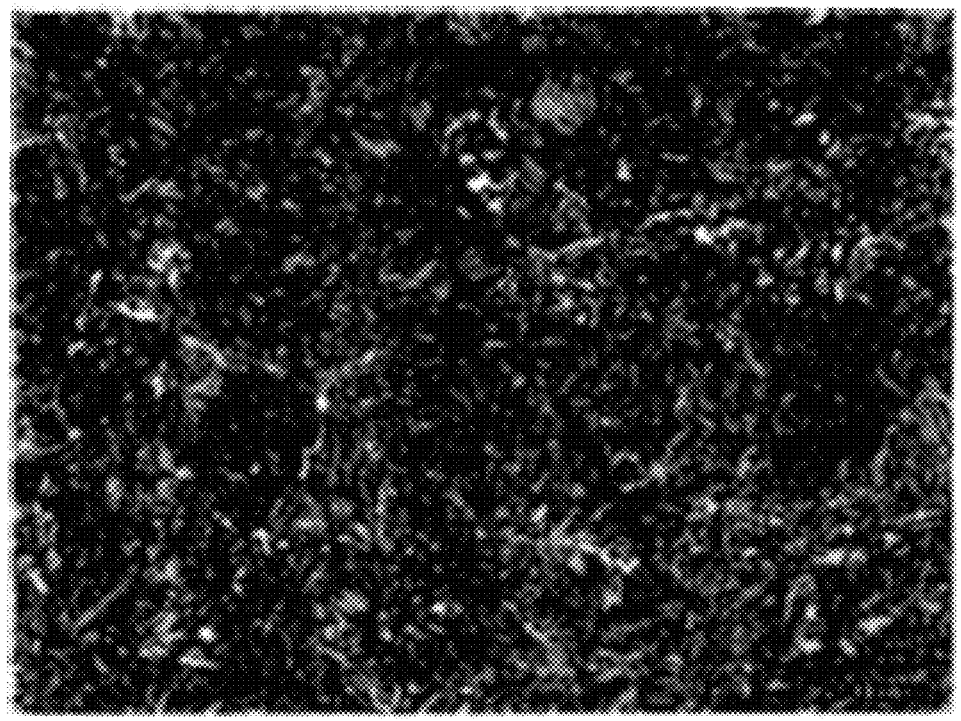
FIG. 8 is a diagram showing a cut section of a brush base material of the inventive example 2 observed by the microscope.
Figure 9:
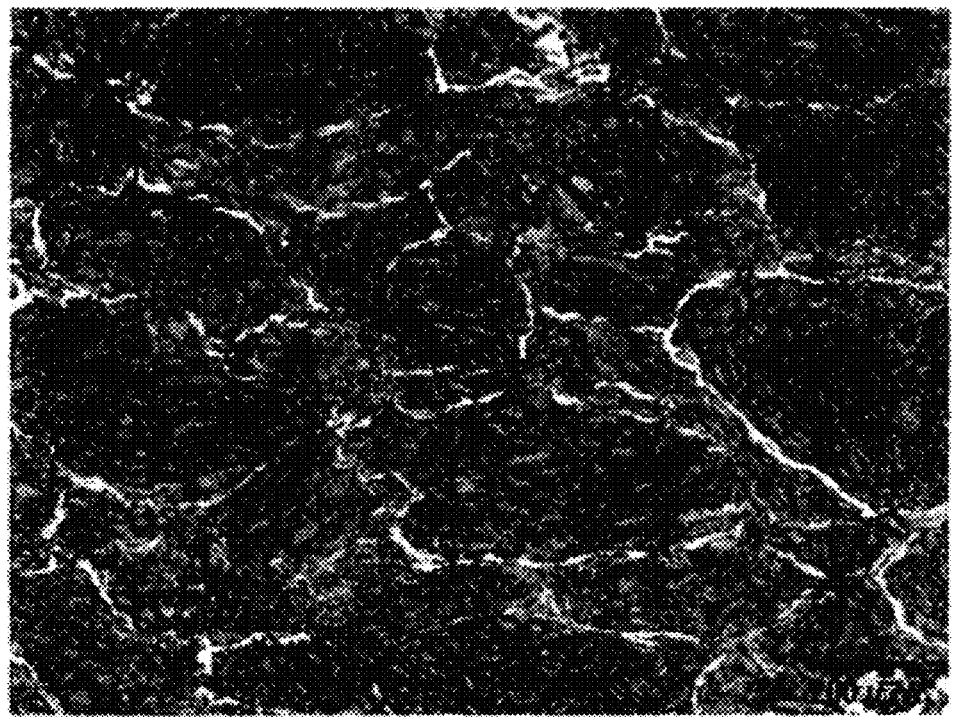
FIG. 9 is a diagram showing a cut section of a brush base material of the inventive example 3 observed by the microscope.

As shown in each of FIGS. 7 to 9, in each of the inventive examples 1 to 3, it was found that the silver powder was arranged intensively among the plurality of particles of the carbonaceous material. In particular, in the inventive example 3 of FIG. 9, it was clearly viewed that the silver powder was arranged to extend in a line shape.

(5-3) Bulk Density, Hardness, Resistivity and Bending Strength

A bar-shaped test piece having the measurement of 6×6×42 mm was fabricated from the brush base material fabricated in each of the inventive examples 1 to 7 and the comparative examples 1 to 3, and the bulk density, the hardness, the bending strength and the electrical resistivity of the test piece were measured. The hardness was measured by the use of a C-type Shore hardness meter.

In a Table 1, the content of silver and the average particle diameter of the carbonaceous material in each of the inventive examples 1 to 7 and each of the comparative examples 1 to 3 are shown, and the results of measurement of these bulk density, hardness, bending strength and electrical resistivity are shown.

TABLE 1

|  | Content of Silver (% by weight) | Average Particle Diameter (mm) | Bulk Density (g/cm$^3$) | Hardness | Bending Strength (MPa) | Resistivity (uΩ · m) |
|---|---|---|---|---|---|---|
| Inventive Example 1 | 2.5 | 0.8 | 1.54 | 17 | 14.5 | 336 |
| Inventive Example 2 | 5.0 | 0.8 | 1.56 | 17 | 15.0 | 103 |
| Inventive Example 3 | 10.0 | 0.8 | 1.63 | 18 | 14.5 | 18 |
| Inventive Example 4 | 2.5 | 2.0 | 1.51 | 17 | 12.4 | 332 |
| Inventive Example 5 | 2.5 | 1.5 | 1.51 | 15 | 12.3 | 299 |
| Inventive Example 6 | 2.5 | 1.0 | 1.51 | 16 | 12.4 | 346 |
| Inventive Example 7 | 2.5 | 0.5 | 1.52 | 17 | 12.8 | 375 |
| Comparative Example 1 | 0 | 0.25 | 1.51 | 17 | 21.6 | 445 |
| Comparative Example 2 | 0 | 0.8 | 1.51 | 16 | 17.0 | 531 |
| Comparative Example 3 | 2.5 | 0.25 | 1.51 | 16 | 16.5 | 430 |

As shown in the Table 1, as compared to the comparative example 1 and the comparative example 2, the electrical resistivity in each of the inventive examples 1 to 7 is low. Thus, it was found that, in the case where the brush base material was fabricated from the brush material including the silver powder and the carbonaceous material, the electrical resistivity was low as compared to the case where the brush base material was fabricated by only the carbonaceous material. Further, as compared to the comparative example 3, the electrical resistivity in each of the inventive examples 1 to 7 is low. Thus, it was found that, in the case where the average particle diameter of the carbonaceous material was 0.3 mm or more, the electrical resistivity was low as compared to the case where the average particle diameter of the carbonaceous material was smaller than 0.3 mm. Further, the electrical resistivity is lower in the inventive example 2 than the inventive example 1, and the electrical resistivity is lower in the inventive example 3 than the inventive example 2. Thus, it was found that, in the case where the average particle diameters of the carbonaceous materials were the same, the higher the content of the silver was, the lower the electrical resistivity was.

Further, as for the inventive example 1 and the inventive examples 4 to 7 in which the contents of the silver were the same, even if the average particle diameters of the carbonaceous materials were different from one another in a range of 0.5 mm or more and 2.0 mm or less, there was no large difference in electrical resistivity.

Further, it was found that the bending strength in each of the inventive examples 1 to 7 was in a range of 12.3 MPa or more and 14.5 MPa or less, and was in an appropriate range as the bending strength of the brush 1 used in the motor 10 of FIG. 1. As for the bulk density and the hardness, there was no large difference among the inventive examples 1 to 7 and the comparative examples 1 to 3.

(5-4) Motor Efficiency

The brush 1 having the measurement of 6.1×9×20 mm was fabricated from the brush base material fabricated in each of the inventive examples 1 to 7 and the comparative examples 1 to 3, and the brush 1 was used in the motor 10 of a vacuum cleaner. Then, the motor efficiency was measured. The motor efficiency here refers to a ratio of mechanical energy that is output by the motor 10 to electrical energy that is input to the motor 10. The lower the electrical resistivity of the brush 1 is, the higher the motor efficiency is. The measurement of the motor efficiency was performed in accordance with DIN (German Industrial Standard) 44959 "Measurement Method of Suction Work Rate of Vacuum Cleaner."

In the present measurement, two motors 10 were used. In one motor 10 (hereinafter referred to as a first motor 10), the brush 1 corresponding to each of the inventive examples 1 to 3, the comparative example 1 and the comparative example 2 was used, and a relationship between the content of silver in the brush base material and the motor efficiency was examined. In the other motor 10 (hereinafter referred to as a second motor 10), the brush 1 corresponding to each of the inventive examples 4 to 7, the comparative example 1 and the comparative example 3 was used, and a relationship between the average particle diameter of the carbonaceous material and the motor efficiency was examined. For any of the motors 10, each of a rated voltage and a power voltage was 100 V, a frequency was 60 Hz, and the pressure applied from the brush 1 to the rotating body 2 (FIG. 1) was 40 KPa. Further, an aperture diameter of a suction port was 19 mm. Further, aging was performed for 20 minutes until an operation of the motor 10 was stable, and then the motor efficiency was measured.

Figure 10A:
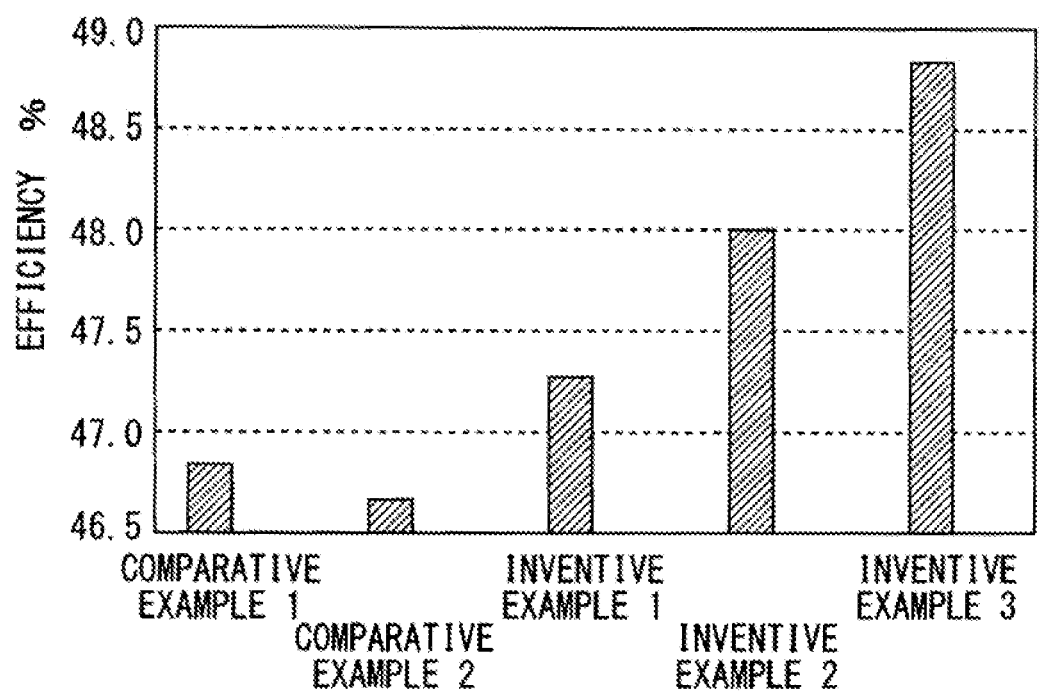
FIGS. 10A and 10B are diagrams showing results of measurement in a first motor.
Figure 10B:
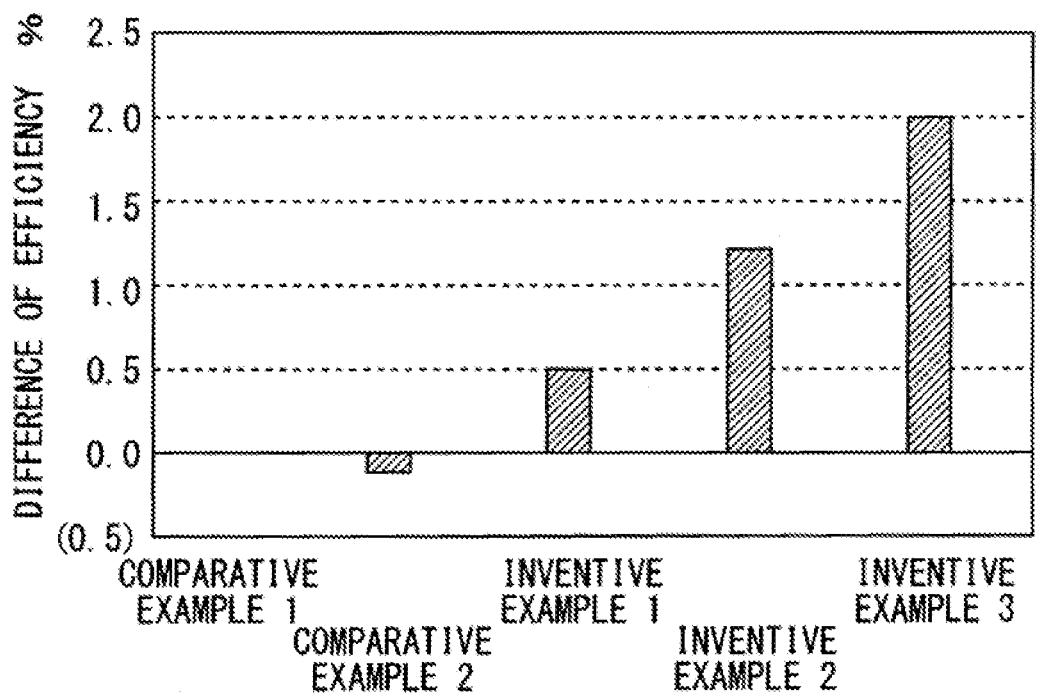
Figure 11A:
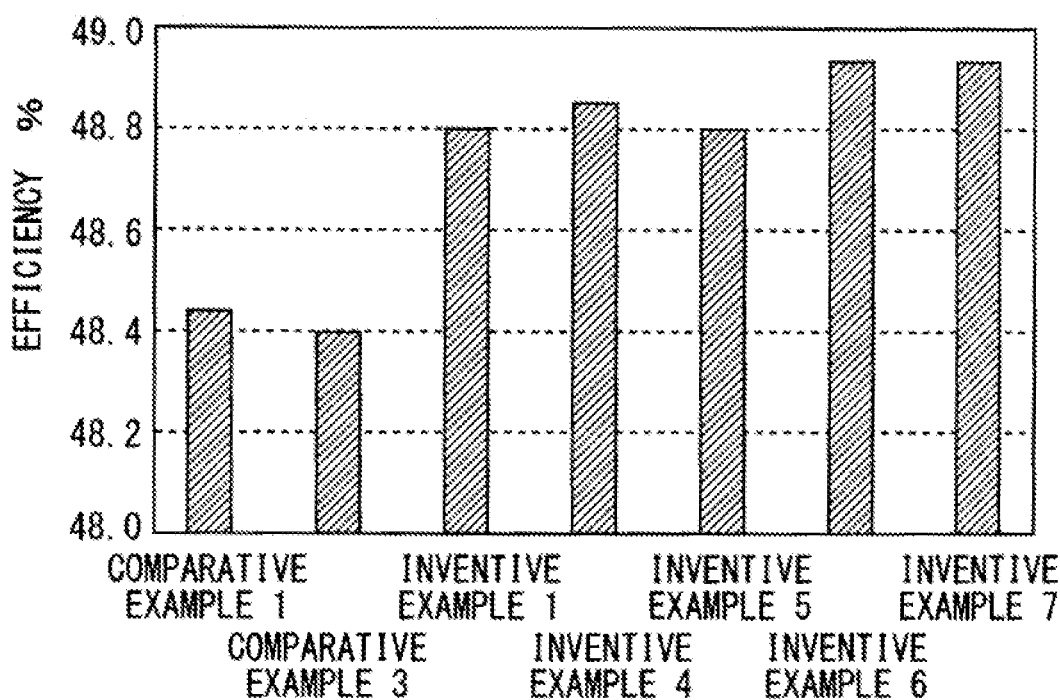
FIGS. 11A and 11B are diagrams showing results of measurement in a second motor.
Figure 11B:
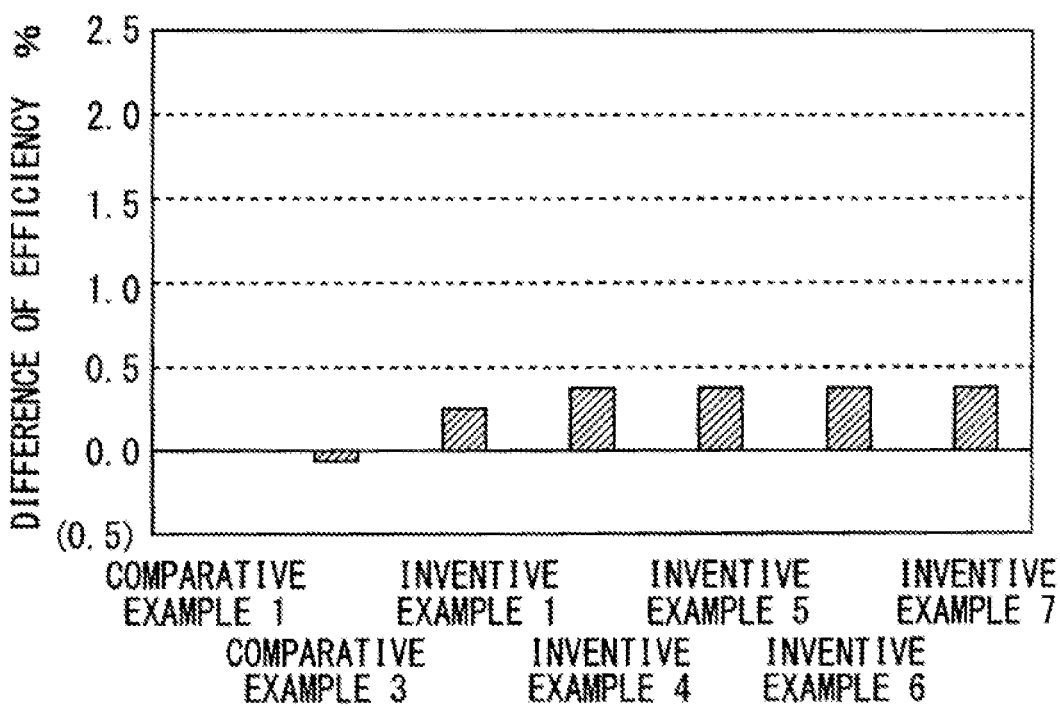

FIGS. 10A and 10B are diagrams showing results measurement in the first motor 10. FIGS. 11A and 11B are diagrams showing results of measurement in the second motor 10. In each of FIGS. 10A and 11A, the measured motor efficiency is shown. In each of FIGS. 10B and 11B, a difference between the motor efficiency in the case where the brush 1 corresponding to the comparative example 1 is used, and the motor efficiency in the case where the brush 1 corresponding to another example is used (a difference of efficiency) is shown.

In the first motor 10, as shown in FIGS. 10A and 10B, the motor efficiency was from 46.7 to 46.8% in the case where the brush 1 corresponding to each of the comparative example 1 and the comparative example 2 was used. On the other hand, the motor efficiency was from 47.3 to 48.8% in the case where the brush 1 corresponding to each of the inventive examples 1 to 3 was used.

In this manner, in the case where the brush 1 corresponding to each of the inventive examples 1 to 3 was used, the motor efficiency was high as compared to the case where the brush 1 corresponding to each of the comparative example 1 and the comparative example 2 was used. Thus, it was found that, in the case where the brush base material was fabricated from the brush material including the silver powder and the carbonaceous material, the motor efficiency was high as compared to the case where the brush base material was fabricated from only the carbonaceous material.

Further, the motor efficiency was higher in the case where the brush 1 corresponding to the inventive example 2 was used than the case where the brush 1 corresponding to the inventive example 1 was used. The motor efficiency was higher in the case where the brush 1 corresponding to the inventive example 3 was used than the case where the brush 1 corresponding to the inventive examples 2 was used. Thus, it was found that, in the case where the average particle diameters of the carbonaceous material were the same, the higher the content of silver was, the higher the motor efficiency was.

In the second motor 10, as shown in FIGS. 11A and 11B, the motor efficiency was 48.4% in the case where the brush 1 corresponding to each of the comparative example 1 and the comparative example 3 was used. On the other hand, the motor efficiency was from 48.8 to 48.9% in the case where the brush 1 corresponding to each of the inventive examples 4 to 7 was used.

In this manner, in the case where the brush 1 corresponding to each of the inventive examples 4 to 7 was used, the motor efficiency was high as compared to the case where the brush 1 corresponding to the comparative example 3 was used. Thus, it was found that, in the case where the average particle diameter of the carbonaceous material was 0.5 mm or more, the motor efficiency was high as compared to the case where the average diameter of the carbonaceous material was smaller than 0.5 mm.

INDUSTRIAL APPLICABILITY

The present invention can be utilized effectively for various types of motors.

The invention claimed is:

1. A resin bonded carbonaceous brush including:
   a carbonaceous material that includes carbon powder and also includes only bonding by a non-carbonized resin as a binder; and
   metallic powder arranged among particles of the carbonaceous material, wherein
   an average particle diameter of the carbonaceous material is 0.3 mm or more, and
   a ratio of the metallic powder to the entire carbonaceous material and metallic powder is 1% by weight or more and 30% by weight or less.

2. The resin bonded carbonaceous brush according to claim 1, wherein
   the average particle diameter of the carbonaceous material is 2.5 mm or less.

3. The resin bonded carbonaceous brush according to claim 1, wherein
   the metallic powder is silver powder.

4. The resin bonded carbonaceous brush according to claim 1, wherein
   a metal layer is formed by the metallic powder arranged among the particles of the carbonaceous material, and the metal layer has a thickness of 1 μm or more and 20 μm or less.

5. A method of manufacturing a resin bonded carbonaceous brush comprising the steps of:
   fabricating a carbonaceous material by mixing carbon powder and a resin;
   adjusting an average particle diameter of the formed carbonaceous material to 0.3 mm or more;
   fabricating a brush material by mixing the carbonaceous material and metallic powder of which the average particle diameters are adjusted;
   molding the fabricated brush material; and
   performing heat-treating on the molded brush material at a temperature at which the resin included in the carbonaceous material does not carbonize, to bond the resin included in the carbonaceous material, wherein
   a ratio of the metallic powder to the entire carbonaceous material and metallic powder is adjusted to 1% by weight or more and 30% by weight or less in the step of mixing the carbonaceous material and the metallic powder.

6. The method of manufacturing the resin bonded carbonaceous brush according to claim 5, wherein
   the step of fabricating the brush material is performed with the resin in the carbonaceous material being uncured.

7. The method of manufacturing the resin bonded carbonaceous brush according to claim 5, wherein
   an average particle diameter of the metallic powder is 0.5 μm or more and 20 μm or less in the step of fabricating the brush material.

* * * * *